United States Patent
Sosseh et al.

(10) Patent No.: US 11,275,684 B1
(45) Date of Patent: Mar. 15, 2022

(54) MEDIA READ CACHE

(71) Applicant: Seagate Technology LLC, Fremont, CA (US)

(72) Inventors: Raye A. Sosseh, Minneapolis, MN (US); Brian T. Edgar, Minneapolis, MN (US); Mark A. Gaertner, Fremont, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/021,493

(22) Filed: Sep. 15, 2020

(51) Int. Cl.
*G06F 12/0802* (2016.01)

(52) U.S. Cl.
CPC .... *G06F 12/0802* (2013.01); *G06F 2212/205* (2013.01)

(58) Field of Classification Search
CPC .................................................. G06F 12/0802
USPC ......................................................... 711/118
See application file for complete search history.

(56) References Cited

U.S. PATENT DOCUMENTS

| | | | |
|---|---|---|---|
| 8,327,076 B2 | 12/2012 | Murphy et al. | |
| 2004/0117587 A1* | 6/2004 | Arimilli | G06F 12/08 711/203 |
| 2012/0102261 A1 | 4/2012 | Burger et al. | |
| 2017/0364447 A1* | 12/2017 | Nazarov | G06F 3/0656 |

* cited by examiner

*Primary Examiner* — Jae U Yu
(74) *Attorney, Agent, or Firm* — Kirk A. Cesari; Christian W. Best (57) ABSTRACT

Systems and methods are disclosed for employing a media read cache in a storage device. In certain embodiments, an, an apparatus may comprise a data storage drive including a volatile read cache, and a disc memory including a primary data storage region of the storage device configured for long-term storage of data via persistent logical block address to physical block address mapping, and a media read cache region configured to store a copy of data from the volatile read cache. The data storage drive may be configured to perform a read operation including: retrieve read data from the volatile read cache based on determining that the read data is available in the volatile read cache, and retrieve the read data from the media read cache based on determining that the read data is not available in the volatile read cache and is available in the media read cache.

20 Claims, 7 Drawing Sheets

| Cache table | | | | | |
|---|---|---|---|---|---|
| LBA | Length | Volatile | MRC1 | MRC2 | Dirty |
| L1 | 7 | - | P1 | P281 | 0 |
| L28 | 1 | V1 | P54 | P225 | 0 |
| L55 | 4 | - | P8 | - | 1 |
| L208 | 17 | V9 | - | - | 1 |

⋮

504

| Logical Address Mapping Table | | |
|---|---|---|
| LBA | Length | Mapped to |
| L1 | 15 | P1001 |
| L17 | 6 | P829 |
| L28 | 7 | P52 |
| L36 | 14 | P1248 |

MEDIA READ CACHE

SUMMARY

In certain embodiments, an apparatus may comprise a data storage drive including a volatile read cache, and a disc memory including a primary data storage region of the data storage drive configured for long-term storage of data via persistent logical block address (LBA) to physical block address (PBA) mapping, and a media read cache region configured to store a copy of data from the volatile read cache. The data storage drive may further include a controller configured to perform a read operation including: determine read data to retrieve for the read operation, retrieve the read data from the volatile read cache based on determining that the read data is available in the volatile read cache, retrieve the read data from the media read cache based on determining that the read data is not available in the volatile read cache and is available in the media read cache, and retrieve the read data from the primary data storage based on determining that the read data is not available in the volatile read cache or the media read cache.

In certain embodiments, a method may comprise receiving, from a host device, a read command requesting read data at a data storage drive including a controller, a volatile read cache, and a disc memory including a primary data storage region of the data storage drive configured for long-term storage of data via persistent logical block address (LBA) to physical block address (PBA) mapping, and a media read cache region configured to store a copy of data from the volatile read cache. The method may include performing a read operation in response to the read command, the read operation including retrieving the read data from the volatile read cache based on determining that the read data is available in the volatile read cache, retrieving the read data from the media read cache based on determining that the read data is not available in the volatile read cache and is available in the media read cache, and retrieving the read data from the primary data storage based on determining that the read data is not available in the volatile read cache or the media read cache.

In certain embodiments, a memory device may store instructions that, when executed, cause a circuit to perform a method comprising receiving, from a host device, a read command requesting read data at a data storage drive including a volatile read cache, and a disc memory including a primary data storage region of the data storage drive configured for long-term storage of data via persistent logical block address (LBA) to physical block address (PBA) mapping, and a media read cache region configured to store a copy of data from the volatile read cache. The method may include performing a read operation in response to the read command, the read operation including: retrieving the read data from the volatile read cache based on determining that the read data is available in the volatile read cache, retrieving the read data from the media read cache based on determining that the read data is not available in the volatile read cache and is available in the media read cache, and retrieving the read data from the primary data storage based on determining that the read data is not available in the volatile read cache or the media read cache.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
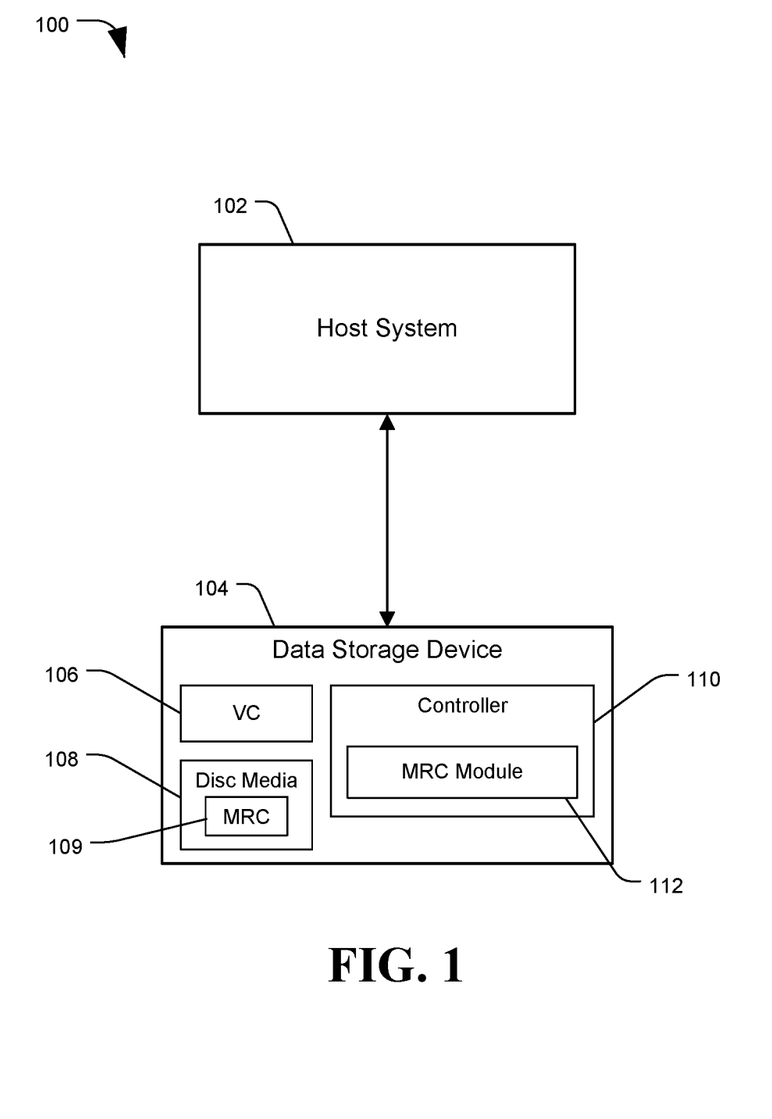
FIG. 1 is a diagram of a system including a media read cache, in accordance with certain embodiments of the present disclosure.

FIG. 1 is a diagram of a system 100 including a media read cache, in accordance with certain embodiments of the present disclosure. The system 100 may include a data storage device (DSD) 104, such as a storage drive or any other device which may be used to store or retrieve data, including a hard disc drive (HDD) or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives.

The DSD 104 may include a volatile cache (VC) 106, a disc media memory 108, and a controller 110. The controller 110 may be one or more processors or circuits configured to perform data access operations, such as reads or writes (also called program operations), to the VC 106 or disc media 108. Data retrieved from, or stored to, the VC 106 or disc media 108, may be processed via the controller 110, a read/write (R/W) channel, or other elements for encoding or decoding data, error correction, or other processing.

The system 100 may include a host device 102, which may also be referred to as the host system, host computer, or simply 'host'. The host 102 can be one or more server-class computers, desktop computers, laptop computers, workstations, tablet computers, telephones, music players, set top boxes, a control system of a self-driving vehicle, other electronic devices, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing). The host 102 may issue data access requests, such as read or write requests, to the DSD 104. In response, the DSD 104 may perform data access operations on the memory 106 or disc media 108 via the controller 110 based on the requests.

The VC 106 may include one or more memory types that do not retain data if power is removed, such as random access memory (RAM), static RAM (SRAM), or dynamic RAM (DRAM), and may include solid state memories that do not rely on moving mechanical components for their operation. The VC 106 may be configured for rapid data storage and retrieval relative to mechanical storage mediums, such as hard disc memories (e.g. disc media 108). However, memories that can perform rapid data storage and retrieval may be expensive, scale poorly, or otherwise have limited capacity due to functional or practical limitations. Accordingly, the DSD 104 may include one or more nonvolatile memories, such as disc media 108, which may retain data even if power is removed, and may be better suited for storing large amounts of data. Disc media 108 may include magnetic storage discs, optical discs (e.g. re-writable compact discs (CDs), digital video discs (DVDs), Blu-ray discs, other disc media, or other large-capacity but high-latency storage media. Disc media 108 may provide inexpensive mass storage, but may involve longer data access latencies than solid-state media, particularly in regard to reads to random locations on the media that may require significant mechanical movement during a read operation.

Due to the relative strengths and weaknesses of different data storage mediums, memories may be configured in tiered storage arrangements to improve data access efficiency. Low latency, expensive memories such as VC 106 may be used as a data cache, while high-latency, large capacity memories such as disc media 108 may be used as a primary long-term storage media for the DSD 104. A primary storage region for the DSD 104 may include persistent, semi-permanent mapping of specific logical data addresses (often referred to as logical block addresses, LBAs) to corresponding specific physical storage locations (sometimes referred to as a physical block address, PBA). The mapping may be semi-permanent in that an LBA may be remapped to a different PBA in certain situations, such as the original PBA developing a defect that prevents reliable data storage, but that the relation of LBA to PBA otherwise remains fixed.

When data is to be written at the DSD 104 (e.g. based on a write command received from host 102), the data may be stored to the VC 106, and then written to the disc media 108. When data is to be read, the controller 110 may first check the VC 106 for a most recent copy of the data, and when the data is in the VC 106, retrieve the data quickly without accessing the disc media 108. If the data is not in the VC 106, the data may be read from the disc and a copy stored to the VC 106, and then provided in response to the read request. Accordingly, the VC 106 may store recently read or written data, and in some embodiments may retain frequently accessed data to better respond to read and write requests.

However, due to the limited capacity of the VC 106, there may be a strict limit on how much data can be retained in the cache for quick read access. When the VC 106 reaches a capacity threshold, data may need to be removed (e.g. flushed or evicted from the VC 106 to another memory) to make space for data from new reads or writes. In some embodiments, non-volatile solid state memory (NVSSM) may be added to the DSD 104 in addition to the VC 106 and disc media 108, in what is sometimes referred to a hybrid drive. The NVSSM may include mediums such as Flash memory, which may be used as an intermediate cache between the VC 106 and disc media 108, to expand the capacity of the read cache to some extent. However, the NVSSM may still be limited in capacity due to cost or other concerns.

Read performance of the DSD 104 may be improved by expanding the capacity of a read cache without the cost or similar limitations of adding additional VC 106 or other solid state memory capacity. Accordingly, the DSD 104 may be configured to employ a media read cache (MRC) 109. As used herein, media read cache 109 may refer to a read cache implemented on a disc media 108 or similar high capacity, long-latency storage medium. A media read cache may be a separate concept from media write cache (or "scratchpad") region of a memory, which may be implemented on a disc memory 108 as a location where random dirty data (e.g. data that has not yet been written to its mapped location in nonvolatile primary storage) can be quickly copied from the VC 106 to a nonvolatile memory. Media write caches can be helpful for quickly storing dirty data to a nonvolatile memory, for example, during high volume workloads when it would be time-prohibitive to write the random data to the properly mapped LBA to PBA locations in the primary storage region, due to seek and rotational latencies of accessing random locations on a disc memory. The data may then later be organized and written from the media write cache to the proper locations in primary storage. However, a media write cache, to which random data is written, may not function effectively as a media read cache 109, due to the random collection of data in the write cache and the read latencies that come with reading data from random locations. Instead, optimizations can be applied to obtain a significant time-saving advantage in accessing data from a media read cache over simply accessing the data from its persistently-mapped location in primary storage. For example, data likely to be read in close proximity to each other could be organized together in a MRC 109 so that large amounts of data likely to be requested closely together can be retrieved in a single read operation. In some examples, both write and read data could be copied from the VC 106 to the MRC 109, thereby grouping data likely to be accessed in temporal proximity for easy future reading, as well as committing dirty data to nonvolatile storage, potentially all in a single write operation. Embodiments where both read data and dirty write data are copied to the MRC 109 may provide a mixed read-and-write cache. Optimizing the organization of data in, and efficient data access to, the MRC 109 can provide time-saving advantages over systems lacking the described MRC 109.

Effectively utilizing the disc media 108 as a MRC 109 may include optimizing the selection and placement of cached data to minimize read latencies associated with the electromechanical operation of the disc media 108. To this end, the controller 110 may include a MRC module 112. The MRC module 112 may be configured to perform operations described herein to implement a MRC 109 on disc media 108, including intelligent selection and placement of data, and retrieval of data from the MRC 109. In some embodiments, the MRC module 112 may also provide caching information, such as metadata, to the host 102 regarding the use of the MRC 109 and arrangement of cached data, thereby allowing the host 102 to make intelligent data access decisions based on the caching information. The MRC module 112 may be one or more processors, controllers, or other circuits, or it may be a set of software instructions that, when executed by a processing device, perform the functions of the MRC module 112. In some embodiments, the MRC module 112 may be part of the controller 110, or executed by the controller 110, or the MRC module 112 may be incorporated into other components, or a stand-alone component of the DSD 104. An example embodiment of system 100, including a more detailed diagram of DSD 104, is depicted in FIG. 2.

Figure 2:
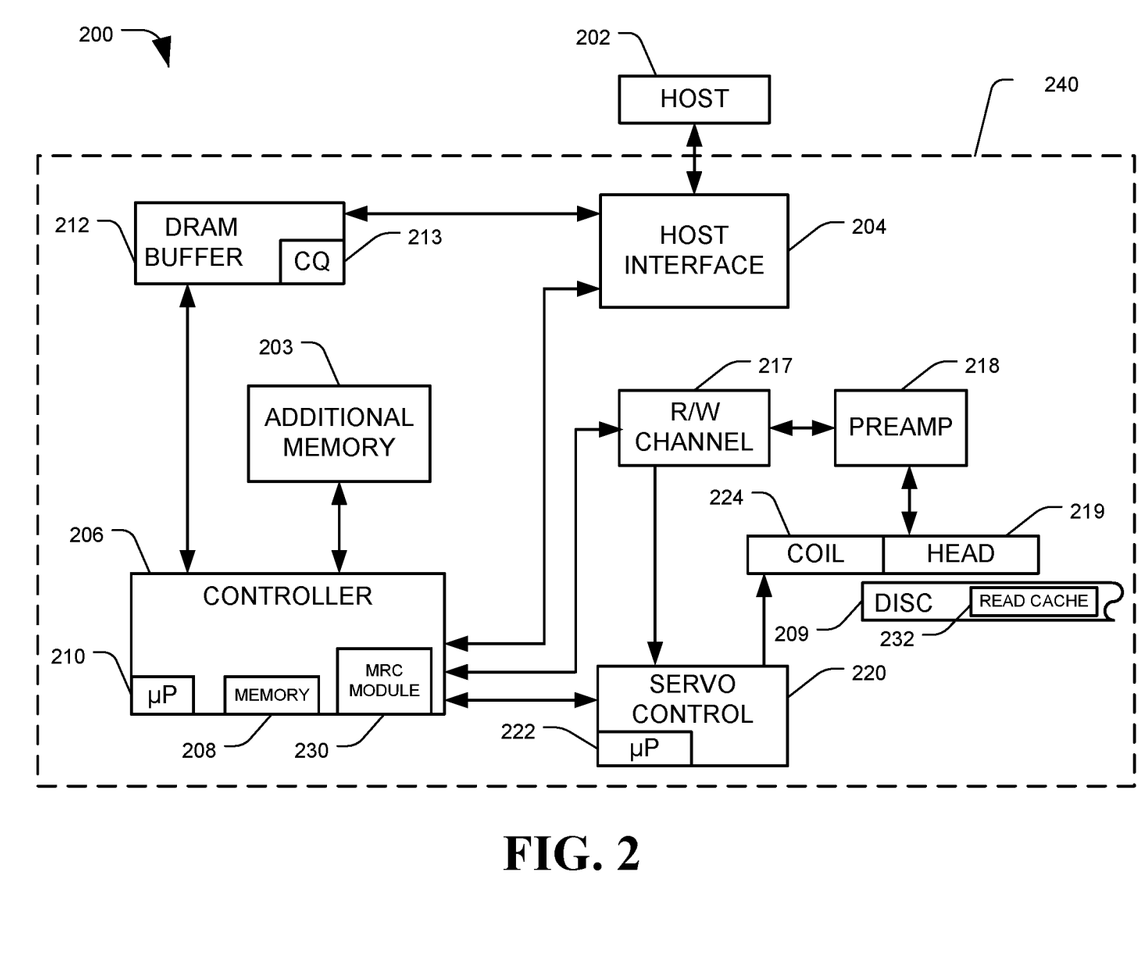
FIG. 2 is a diagram of a system including a media read cache, in accordance with certain embodiments of the present disclosure.

FIG. 2 is a diagram of a system, generally designated 200, including a media read cache, in accordance with certain embodiments of the present disclosure. Specifically, FIG. 2 provides a functional block diagram of an example data storage device (DSD) 200, which may be an example of the DSD 104 of FIG. 1. The DSD 200 may also be referred to as hard disc drive (HDD) 200, according to some embodiments. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB (universal serial bus), IEEE (Institute of Electrical and Electronics Engineers standard) 1394, Compact Flash, SATA (Serial AT Attachment), eSATA (External SATA), PATA (Parallel AT Attachment), SCSI (Small Computer System Interface), SAS (Serial Attached SCSI), PCIe (Peripheral Component Interconnect Express), Fibre Channel, Ethernet, or Thunderbolt, among others. The interface 204 may include a connector that allows the DSD 200 to be physically removed from the host 202. The DSD 200 may have a casing 240 housing the components of the DSD 200.

The buffer 212 can temporarily store data during read and write operations, and can include a command queue (CQ) 213 where multiple operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. The controller may execute firmware (FW) (e.g. instructions stored to a memory, such as additional memory 203) to control the operations of the DSD 200. The controller 206 may control data access operations, such as reads and writes, to one or more memories, such as disc memory 209, additional memory 203, or any combination thereof. For example, additional memory 203 may include volatile memory such as dynamic random access memory (DRAM) or static RAM (SRAM), nonvolatile solid state memory such as NAND flash memory, read-only memory (ROM), or other memory types. The additional memory 203 can function as a working memory for storing temporary data, a cache to store recently or frequently read or written data, or data likely to be read soon, or for other temporary data storage. Additional memory 203 may also function as main long-term storage instead of or in addition to disc(s) 209. A DSD 200 containing multiple types of nonvolatile storage mediums, such as a disc(s) and flash, may be referred to as a hybrid storage device. The memory 208 may similarly include DRAM, SRAM, or similar volatile memory, and may store FW instructions during device operation, cached data, or other information.

The DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of read-back signals. Head(s) 219 may include a read head element and a write head element. A servo control circuit 220 may use servo data to provide the appropriate current to the coil 224, sometimes called a voice coil motor (VCM), to position the head(s) 219 over a desired area of the disc(s) 209 by moving an adjustable arm on which the head(s) 219 are mounted. The controller 206 can communicate with a processor 222 of the servo control circuit 220 to move the head(s) 219 to the desired locations on the disc(s) 209 during execution of various pending commands in the command queue 213.

The DSD 200 may include a volatile cache to store recently or frequently read or written data. The volatile cache may be included in DRAM buffer 212, memory 208, additional memory 203, or in another location. In some embodiments, a secondary cache tier may be located in a solid state memory, such as a NAND flash embodiment of additional memory 203. The DSD 200 can also include one or more regions or partitions of disc(s) 209 designated as one or more a media read caches (MRCS) 232. For example, the DSD may include one or more disc(s) 209, and the storage area of one or more of the disc(s) may be partitioned into isolated sections, with one or more of the data storage partitions designated as media read cache regions configured to store dynamic selections of data to be quickly accessed in response to read requests. In another example, certain PBA ranges of the disc(s) may be designated as media read cache regions, without the need for dedicated partitions. The media read cache region(s) may be reserved system areas only accessible by the DSD, and may not have static LBA addresses mapped to those regions so that a host cannot access them directly via LBA-addressed read or write operations.

As used herein, a "region" may refer to a physical storage area on the disc(s) 209 that are physically contiguous. For example, one or more full concentric tracks may comprise a region, or a section of a plurality of concentric tracks that fall within one or more adjacent servo wedges may comprise a region (e.g. the portion of tracks 10-20 that fall within servo wedge 8). In another example, the disc(s) 209 may comprise a stack of multiple discs, and sectors co-located on multiple discs in the stack, such that they can be read in parallel (see, e.g. FIG. 4), can be considered a region. A MRC 232 may include one or more regions. A system may also include multiple MRCS 232, with one or more region in each MRC 232. Other embodiments are also possible.

The DSD 200 may include a media read cache (MRC) module 230. The MRC module 230 may be a processor, controller, or other circuit, or it may be a set of software instructions that, when executed by a processing device, perform the functions of the MRC module 230. In some embodiments, the MRC module 230 may be part of or executed by the controller 206, incorporated into other elements of the DSD 020, a standalone component within the DSD 200, or any combination thereof. The MRC module 230 may control operations of DSD 200 relating to the selection, storage, and retrieval of data to or from the media read cache 232 as described herein.

The MRC module 230 may determine what data to store to the MRC 232. For example, the MRC module 230 may determine which data from the volatile cache may be best suited to copy to the MRC 232, allowing the copied data to be evicted from the volatile cache immediately or at a later point. For example, the MRC module 230 may identify and select groups of data that are likely to be read in close temporal proximity (e.g. within a selected span of time), so that a significant amount of valuable data may be read from the MRC 232 in a single uninterrupted read operation, thereby minimizing delays associated with reads to the disc(s) 209. A single read operation may mean an operation initiated by the DSD 200 (e.g. in response to a host 202 read command) to read data from the disc 209, uninterrupted by a track seek (or potentially only including a track-to-track seek to an adjacent track mid-operation). In some embodiments, a single uninterrupted read operation may include a skip read, where only selected sectors along a track are read and other sectors are skipped. Multiple LBA-disjoint data fragments may be retrieved during the single read operation, either stored contiguously to each other in an MRC area, or from non-contiguous locations at various rotational positions of the MRC 232. While reading multiple LBA ranges during a single read operation may provide a large read amortization benefit, MRC regions 232 can provide other benefits. For example, if multiple desirable LBA ranges are stored to an MRC 232 spanning multiple tracks and cannot be read in a single read operation, the data may still be able to be retrieved over multiple read operations with minimal seek latency, thereby still providing access speed benefits over accessing random LBA ranges at multiple radial and circumferential positions on a disc.

When a read request is received for data within the MRC 232, a single read operation may be used to retrieve the requested data along with speculative data likely to be read soon. Speculative data may not be specified in a read request, but may be predicted or anticipated to be requested in a read request within a selected time period of specifically requested data. Data likely to be read in close proximity may be determined by various methods, such as monitoring access histories for files or address ranges, machine learning, bloom filters, "hints" from the host 202 (e.g. indications of which files will be read, applications or processes running on the host, or other information that can be used to predict data accesses trends), other methods, or any combination thereof.

Selected data may be copied from higher cache tiers to the MRC 232, so that the selected data can be erased or overwritten in the higher tier. The MRC module 230 may copy data to the MRC 232 when the drive 200 is idle. Copying data to the MRC 232 may be performed or skipped when the drive is busy (e.g. if data must be evicted from the high-tier cache(s) without a break in the DSD 200 workload), depending on design goals or delay tolerance in the workload. For example, data may be copied to the MRC 232 while the drive is busy if a determination is made that flushing to the MRC 232 would achieve a throughput advantage based on a pending workload (e.g. based on upcoming reads that may be serviced via a single read operation to the disc 209, even if the volatile cache space is needed for other data right now). If a determination is made that flushing to the MRC 232 would likely not provide a throughput advantage based on a pending or expected workload, copying data to the MRC 232 while the drive is busy may be skipped.

The MRC module 230 may also determine where to store data selected for the MRC 232. Reducing latencies from media reads may involve intelligently positioning data, so that it can be read with minimal delays. Latencies associated with disc media accesses can include seek latencies and rotational latencies. Seek time, delay, or latency can arise when the head(s) 219 is mechanically moved (via coil 224) from being positioned over a first data track to a second data track at a different radial position of the disc(2) 209. Rotational time, delay, or latency can arise when a read cannot begin until the disc(2) has rotated far enough so that the requested data is underneath the read head(s) 219. This can include a nearly full disc revolution if the head(s) 219 arrive at the target track just after the requested data has passed. If the disc(s) had not been spinning when a data access operation is initiated, there may also be a delay associated with spinning up the disc to reading speed. Once the read head(s) is positioned over the desired track and begun a read operation, data can be read rapidly.

To account for these mechanical delays, the MRC module 230 may store data likely to be read in temporal proximity to the MRC 232 in a manner permitting it to be read during a single uninterrupted read operation (e.g. a continuous read without seeking to different tracks). Data likely to be read close in time may be stored sequentially so that the data can be read during a single read operation without significant rotational delays. The MRC 232 may optionally leave space between sets of LBA ranges, so that new data likely to be accessed in close proximity to data already stored to the MRC 232 may be added later to the MRC 232 near the already-stored data.

Further, the MRC 232 may be configured to allow faster reading in other ways. For example, more data may be stored and read per revolution at the outer diameter (OD) of the disc(s) 209 than at the inner diameter (ID), and therefore locating the MRC 232 at the OD may allow for accessing more data more quickly than other regions of the disc(s) 209. To further lower delays, the actuator arm on which the head(s) 219 is mounted may be positioned proximate to the MRC 232 during idle time, so that the head(s) 219 would not need to seek far to initiate a read.

The MRC module 230 may also configure the MRC 232 region(s) so that more data can be stored in a smaller area, both saving space and allowing more data to be read while minimizing seek and rotational latencies. For example, the MRC 232 regions may be configured with a higher tracks per inch (TPI) or bits per inch (BPI) than other regions of the disc(s). The data in the MRC 232 may also be stored with less or no error correction data, which may improve reading response times, both by fitting more user data within a given area, and by eliminating time required for decoding the data. In another example, data may be compressed prior to storing it to the MRC 232, increasing the amount of data that can be stored in a given physical area. While increasing the data density or reducing error correction coding may reduce the reliability of the written data, this may not be a great concern if the data is securely recorded to nonvolatile memory elsewhere (e.g. in the primary data storage region of the DSD 200).

In another example, read times may be improved by maintaining multiple physical locations on the disc(s) designated as MRC 232 zones or regions. For example, each of multiple disc surfaces may have one or more corresponding read heads 219. The DSD 200 may be capable of reading from multiple disc surfaces simultaneously, which may be referred to as "parallelism". By distributing an MRC 232 region on multiple disc 209 surfaces, data likely to be read in temporal proximity may be retrieved using parallelism, reducing the overall required read time. In another example, multiple MRC 232 regions may be distributed at different locations across a single disc 209 surface, such as at different wedge (e.g. circumferential position on the disc) or cylinder (e.g. radial position on the disc, such as near the ID, OD, or middle diameter MD) locations. If copies of cached data are stored to multiple MRC 232 regions, the read head(s) 219 may be able to begin reading from one of those regions faster than others in the middle of a set of operations, thereby lowering seek and, potentially, rotational latencies.

In some embodiments, the MRC module 230 may also determine additional information to return to a host 202 in addition to requested read data. For example, the MRC module 230 may send metadata to the host indicating LBA ranges stored to the MRC 232, or LBA ranges that were retrieved from the MRC (and loaded into the faster volatile cache) along with data specifically requested by the host 202. For example, the MRC module 230 may have determined that LBA ranges 240-260, 380-420, and 830-840 are likely to be accessed in temporal proximity to each other by the host 202, and therefore should be copied from the volatile cache to the MRC 232 in a manner that allows rapid data access. If the host 202 sends a request for LBAs in the 240-260 range, the MRC 232 may control retrieval of all three LBA ranges from the MRC 232 into the volatile cache, and may send the host 202 metadata indicating all three ranges were retrieved. If the pre-fetched data will be needed soon, this metadata may allow the host to prioritize retrieving LBA ranges 380-420 and 830-840 soon, while the data is resident in the volatile cache, rather than waiting such that the data may be evicted again. In another example, the MRC module 230 may send metadata indicating LBA ranges in some or all MRC 323 regions, so the host may have advanced knowledge of which data will be efficient to request together. Additional information may be provided to the host by including metadata into spare portions of a read data response message, or as a separate message distinct from the read response.

The MRC module 230 may also determine efficient methods to retrieve data from the MRC 232. For example, if multiple copies of the same data are stored to different MRC 232 regions, the MRC module 230 may determine which copy would be most efficient to access. If an MRC cache hit occurs (e.g. a determination that requested data is located in the MRC 232), the MRC module 230 may determine which additional data, if any, should be read from the MRC 232 during the read operation. This determination may be made based on the same criteria used to select data to store together to the MRC 232, or may be indicated in an address map (e.g. the map may include metadata identifying related data to be retrieved along with the selected data), or via other methods. The MRC module 230 may also determine which data to remove or overwrite in the MRC 232. Additional details on the placement and access of MRC 232 regions on the disc(s) 209 is discussed in relation to the following figures.

Figure 3:
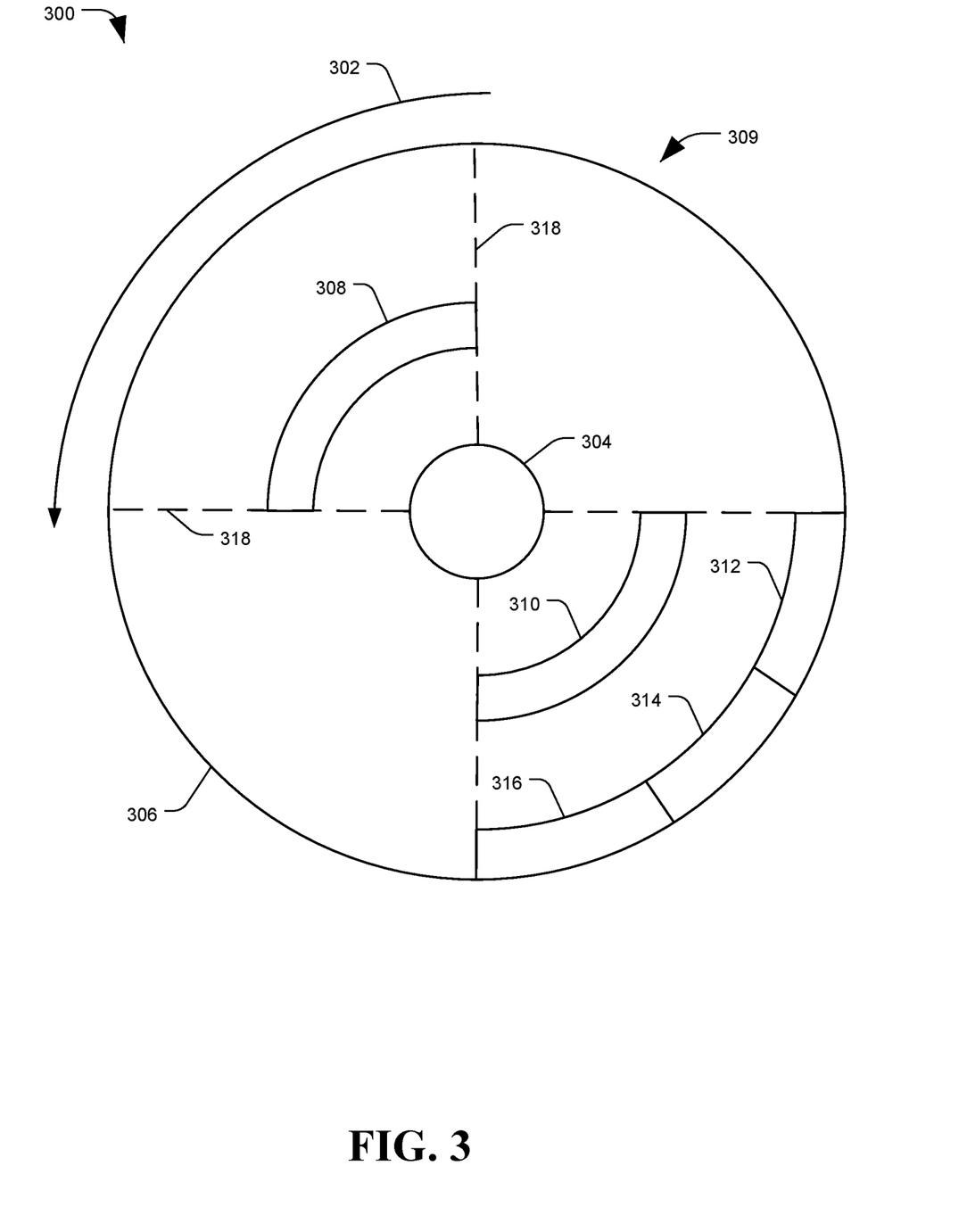
FIG. 3 is a diagram of a system including a media read cache, in accordance with certain embodiments of the present disclosure.

FIG. 3 is a diagram of a system, generally designated 300, including a media read cache, in accordance with certain embodiments of the present disclosure. Specifically, FIG. 3 provides a diagram of an example disc storage media 309, which may be an example of the disc(s) 209 of FIG. 2.

During operation, example disc 309 may spin in the arrow-indicated direction 302, rotating about a central spindle 304. The surface of the disc 309 may include a plurality of concentric data tracks, from the inner diameter (ID) near the spindle 304 to the outer diameter (OD) 306. A head may be positioned over a desired track, and data read from or written to the track as the disc 309 spins below the head.

One or more regions of the disc 309 may be designated as media read cache (MRC) areas, reserved for cached data, and not directly accessible by a host via LBA addressing. The MRC regions may include one or more complete data tracks (which may include sequential or contiguous sets of grouped tracks), non-sequential tracks distributed at various diameters across the disc 309 surface, or a combination thereof. The MRC regions may also include subsections less than a full track (e.g. fewer than all PBAs on a track), and may include subsections of multiple sequential or contiguous sets of tracks, non-sequential subsections of tracks distributed at various diameters (e.g. the track portions within one or more wedges of the disc, with a wedge including the storage area between servo data wedges, represented by exemplary servo data wedge lines 318, extending from the ID 304 to the OD 306). The MRC may refer, collectively, to multiple MRC regions distributed at various points on the surface of the disc media. Multiple disjoint LBA ranges may be stored to a single MRC region, with LBA ranges likely to be accessed in temporal proximity stored together so that they can be retrieved using minimal separate read operations.

Intelligent positioning of MRC regions, and intelligent arrangement of cached data within the MRC regions, can improve read times to the MRC. MRC regions may be located at multiple diametric and radial positions on a disc 309 surface. For example, MRC regions may include segments of a set of multiple contiguous tracks located at approximately a middle diameter (MD) of the disc 309, at different radial locations, at 308 and 310. The MRC regions may also include portions or all of multiple contiguous tracks at the OD, such as an MRC region that includes data segments 312, 314, and 316 (with a data segment being, e.g. an LBA range, a sector, or other data chunks). MRC regions near a MD may have a low average seek time during a busy workload where the position of the read head may be anywhere over the disc 309 diameter when the MRC read begins. MRC regions at the OD may be allow more data to be read faster than regions closer to the ID, due to more data passing underneath a read head during a rotational interval. Further, a read head may be positioned or "parked" near the OD during idle periods, thereby reducing seek times to OD MRC regions for reads initiated during an idle period.

Multiple copies of the same cached data may be stored to different MRC regions, thereby allowing the system to read from a nearest MRC region, and reducing seek latencies, rotational latencies, or both. For example, the same data may be stored to both region 308 and 310, and therefore the data may be read from whichever region was available to read first as the disc 309 rotates, thereby reducing rotational latency. If part or all of the data failed to read from, e.g. region 308, then the DSD could attempt to reread the failed data from the next MRC region 310 without waiting for a full disc revolution. In another example, the same data may be stored to MRC regions at different diameters, such as region 308 and the region including data segment 312, which may limit the maximum seek latency regardless of where the read head is positioned before the MRC read operation begins. The more varied locations the cached data is located, the more read latencies may be reduced to access the data. In some embodiments, data may be copied from a volatile cache to a single MRC region during eviction of the volatile cache, and the data may be copied to more MRC locations if idle time permits. An address map or cache list of cached data may be updated to reflect the locations the cached data is stored, and, e.g. the MRC module 230 may calculate which of multiple locations will be the fastest to access based on an estimated read head position at the start of the read operation.

Data may be selected for storage to the MRC regions based on a determination of which data is likely to be accessed in close temporal proximity. For example, an MRC module 230 may determine that data segments 312, 314, and 316 are frequently accessed closely together in time, and may therefore select these three segments to copy to the MRC from a volatile or higher-tier cache, e.g. during an eviction operation. Each of data segments 312, 314, and 316 may correspond to LBA ranges that are disjoint from each other. The three segments may then be recorded to a MRC region in sequential or close proximity in a manner allowing all three segments to be read during a single read operation. For example, if a read command is received from a host for LBAs corresponding to data segment 314, the DSD may perform a single read operation that retrieves segments 312, 314, and 316, and optionally loads those segments into a higher-tier cache. The data for segment 314 may be returned to a host, and segments 312 and 316 may be quickly available if subsequently requested. In some embodiments, in addition to returning the data for segment 314, the DSD may provide metadata or an indication that data segments 312 and 316 were also loaded and are available at a high cache level.

In some embodiments, gap sector(s) may be left between temporally-related data, allowing additional temporally-related data to be added later in such a way as to allow all the old and new data to be retrieved during a single read operation. If portions of data written to the MRC become invalid (e.g. only some LBAs from an LBA range having been updated or deleted by a host), skip writing may be used to overwrite only selected LBAs while leaving valid LBAs in the MRC. For example, data segments 312, 314, and 316 may represent a set of sequential LBAs written to the MRC, and a host update may invalidate the data stored to 312 and 316, but not 314. A skip write (e.g. a single write operation that only overwrites intermittent sectors in a sector range, skipping over still valid sectors, for example using a bitmask to identify which sectors to write) may be used to update segments 312 and 316 with the updated data, while skipping over 314. In another example, the invalidated segments 312 and 316 may be overwritten with completely different LBAs. The different LBAs may be selected as likely to be accessed in temporal proximity with LBAs of segment 314, so that it is still advantageous to read 312, 314, and 316 in a single read operation.

Figure 4:
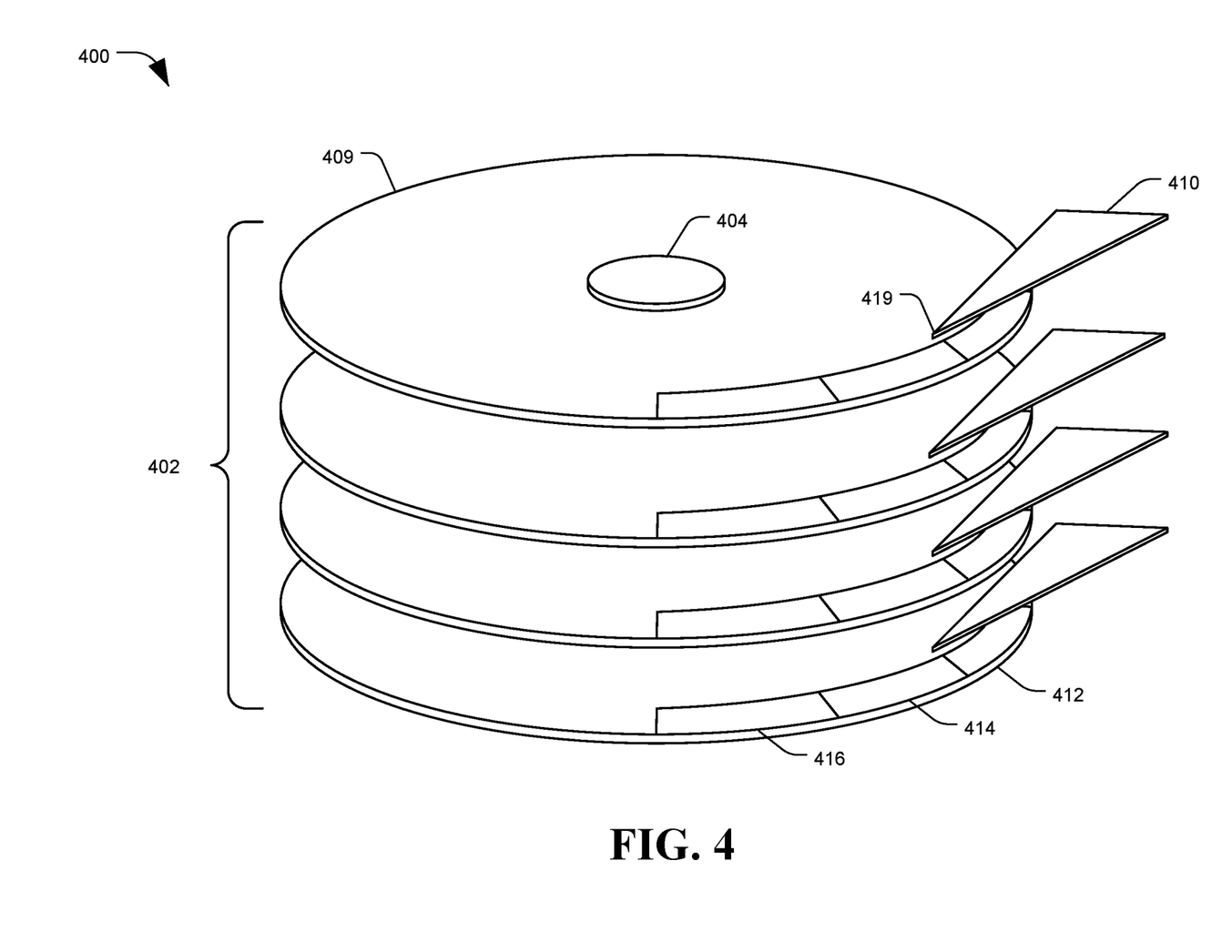
FIG. 4 is a diagram of a system including a media read cache, in accordance with certain embodiments of the present disclosure.

Turning now to FIG. 4, an example implementation applying parallelism is depicted. FIG. 4 is a diagram of a system, generally designated 400, including a media read cache, in accordance with certain embodiments of the present disclosure. Specifically, FIG. 4 provides a diagram of an example disc storage media stack 402, which may be an example of the disc(s) 209 of FIG. 2.

In some DSDs, multiple hard disc platters 409 may be arranged in a stack formation 402, with all of the discs in the stack 402 rotating together around a shared spindle 404. The discs 409 may be recordable on both a top surface and a bottom surface. Reading data from the discs 409 may involve a set of actuator arms 410, each ending in one or more read heads 419, where each recordable surface may have a corresponding arm 410 and head(s) 419 (e.g. an arm 410 may include multiple offset read heads to improve reading from a single disc surface). The actuator arms 410 may move in unison based on a single voice coil motor, such as the VCM 224 of FIG. 2.

Parallelism may involve writing to or reading from multiple disc 409 surfaces simultaneously as the stack 402 and jointly controlled actuator arms 410 operate. In order to improve MRC performance, the MRC regions may be positioned such that corresponding recordable areas on multiple disc 409 surfaces can comprise a single MRC region, where the multiple recordable regions can be accessed simultaneously in parallel. For example, each disc surface may have stored thereto a portion of data that is likely to be requested in temporal proximity, so that a single parallel read operation can retrieve a significant amount of data that may be requested in a short period of time. An example MRC region may include data segments 412, 414, and 416 on each of the stack 402 of discs 409. In some embodiments, all data segments 412 may be likely to be requested together, while all data segments 414 may be a separate set of data likely to be requested with each other, and all MRC segments 416 may be a third set of data likely be requested together, even if none of the segments 412, 414, and 416 are likely to be requested in close proximity to each other. A short parallel read operation may therefore be able to retrieve temporally related data from a selected segment. In another example, all of segments 412, 414, and 416 an all four discs 409 may be likely to be requested in temporal proximity with each other, so a longer parallel read operation can retrieve significant amounts of temporally related data. The disc stack 402 may have multiple such corresponding MRC regions distributed at various points on the surface of two or more disc(s) 409. Example address maps used to track the location of cached and non-cached data are depicted in FIG. 5.

Figure 5:
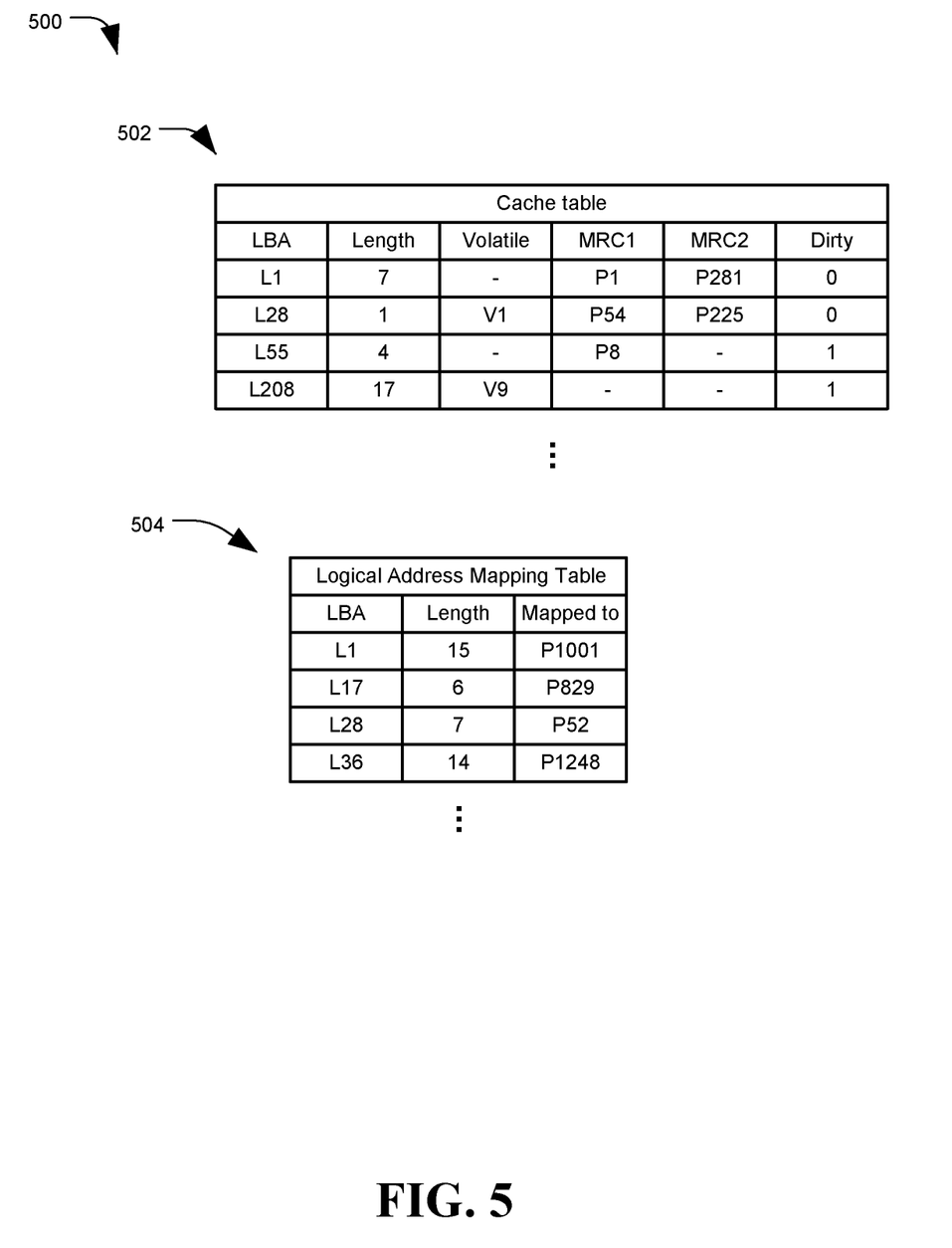
FIG. 5 is a diagram of a system including a media read cache, in accordance with certain embodiments of the present disclosure.

FIG. 5 is a diagram of a system, generally designated 500, including a media read cache, in accordance with certain embodiments of the present disclosure. Specifically, FIG. 5 provides diagrams of example address maps and caching tables used by a DSD to track the location of stored data. For example, the address maps may be employed by a controller 206 or media read cache (MRC) module 230 of FIG. 2.

In the example embodiment of FIG. 5, system 500 may include a cache table 502, and a logical address mapping table 504. The cache table 502 may identify data stored in a cache memory, while logical address mapping table 504 may identify the physical storage locations in a primary data storage region with static logical-to-physical block address mapping. Although depicted as two tables, the cache table 502 and logical address mapping table 504 may be implemented as a single table, or may be divided into more than two tables. Cache table 502 and logical address mapping table 504 may be loaded into a volatile memory during DSD operation, and may be updated as data is written, overwritten, deleted, becomes stale or invalid, or otherwise changed. Cache table 502, logical address mapping table 504, or both may be stored periodically to a nonvolatile memory so that the information may be retained during power-off cycles. In an example, cache table 502 may be maintained as two separate tables, one for volatile cache and one for nonvolatile cache such as the MRC, with only the nonvolatile cache table stored to a nonvolatile memory (as the data in a volatile cache may be lost when power is removed, and therefore there may be no need to retain the volatile cache table between different power-on cycles).

As stated herein, the logical address mapping table 504 may map logical block addresses (LBAs) to physical block addresses (PBAs) in a primary storage region with generally persistent LBA to PBA mapping. In order to reduce storage requirements for the logical address mapping table 504, consecutive sequential LBA values may be represented via a "length" field (e.g. identifying a first LBA 1 and a length of 15 consecutive LBAs starting at the identified PBA location), rather than including a separate entry for each LBA.

During a read operation, the DSD may be configured to first check the cache table 502 to see if the requested data can be retrieved from a cache memory, before checking the logical address mapping table 504. Similar to the logical address mapping table 504, the cache table 502 may include entries identifying a first LBA, the number of LBAs in the range, and one or more locations in cache memories where the data is stored. In a system employing a media read cache, the cache table 502 may include entries for both volatile cache and MRC storage locations. In some embodiments, copies of data may be stored to multiple different MRC regions, and therefore the cache table 502 may include information for each MRC region the data is located in. This may allow the DSD to determine which MRC location is most efficient to access.

In the depicted example, the data for LBAs 1-7 may be located in multiple MRC regions, but no longer stored in the volatile cache. Meanwhile, LBA 28 may have been copied from the volatile cache to MRC locations, but not yet deleted or overwritten in the volatile cache, so that the data is in both cache tiers. LBAs 208-225 may be stored to the volatile cache, and have not been stored to any MRC location.

In some examples, a system may employ one or more mixed media read/write caches, such as a volatile cache that stores both write data received from a host, and read data retrieved from primary storage (e.g. in response to a read command, or speculatively read without a host read command specifically requesting that data). All data in the volatile cache, including both the write and read data, may be checked in response to a new read command. However, when valid write data (e.g. the most recent data for a particular LBA) has not yet been stored to its corresponding primary mapped storage location, it may be considered "dirty" data. Dirty data must be stored to its primary LBA-to-PBA mapped storage location prior to deleting it from temporary storage, or the data will be lost. When data is to be removed from a cache (either volatile or nonvolatile), a determination may be made whether the data is dirty, and if so, it can be stored to its primary storage location before it is erased or overwritten. Therefore, an identifier or flag may also be included in the cache table 502 identifying whether data is "dirty". In the example embodiment, LBAs 55-58 are write data that have been moved from the volatile cache to a MRC location, but the data is still dirty because it has not been recorded to the primary storage region. LBAs 208-225 may be write data that is only be stored in the volatile cache, and therefore dirty and should be recorded to nonvolatile memory before the DSD is powered off to avoid losing data. The volatile cache or MRC may also store read data retrieved from primary storage, which is therefore not dirty. For examples, LBAs 1-7 and 28 are not flagged as dirty, and therefore may be read data, or may be write data that has already been committed to their corresponding primary storage locations.

Whether data is dirty or not may impact the DSDs operations in regard to copying or moving data to the MRC. Data that is not dirty may be copied to the MRC in a format that may improve storage capacity or read speed (e.g. by compression, adjusting data density via higher BPI or TPI, or by reducing or eliminating error correction coding) at the expense of data reliability, since data having a copy in the primary region is not at risk of being lost. When data to be moved from the volatile cache does include dirty data, the DSD may optionally be configured to always store dirty data to the primary data storage area prior to removing the data from a volatile cache, thereby removing the dirty bit. The process of copying dirty data to the primary data storage region, and then also writing the data to the MRC before evicting it from the volatile cache may be a good choice during idle times, but may be time consuming when the DSD is under a heavy workload. Therefore, data may alternately be written to the MRC while it is still dirty, provided the data is written to the MRC in a manner including sufficient quality control standards to reasonably ensure the data will be readable. This may mean eviction from the volatile memory only requires a single write to the disc, even if the data is still considered dirty, because the data is written to a nonvolatile memory in a manner that is secure. Securely writing to the MRC may include employing adequate error correction encoding, using reliable BPI and TPI standards, or otherwise taking reasonable efforts to ensure the data will be readable. By using a MRC with high reliability, the DSD may both co-locate data that may be accessed in temporal proximity, as well as perform nonvolatile backing of volatile dirty data, all with a single write operation.

Accordingly, in some embodiments the DSD may include different MRC regions with different writing standards. For example, MRC1 may be a region that employs a same BPI, TPI, and error correction standard as the primary data storage region, so that dirty data can be evicted to MRC1 without first writing it to the primary region. Meanwhile, MRC2 may be a region configured to be recorded at a higher TPI or BPI, with less or no error correction coding, or otherwise at a lower reliability than a primary storage region. Such a configuration may permit the DSD to select an MRC region to employ during eviction based on a pending workload and whether evicted data is dirty or not. For example, MRC1 may be selected during busy workloads for eviction data including dirty data, and MRC2 may be selected during idle periods (when dirty data can be stored to primary storage first), or when the eviction data does not include dirty data. In some embodiments, during busy workloads the dirty data may be separately evicted to MRC1, while the non-dirty data may be evicted to MRC2. In other embodiments, dirty data may be evicted to a dedicated write cache, while non-dirty data may be evicted to a dedicated media read cache. At any point the DSD may elect to record or copy data to additional MRC regions to provide more read options for reducing seek or rotational latencies (e.g. writing the data to both MRC1 for reliability and then to MRC2 for additional capacity or faster reading).

When data is requested in a read command, the DSD may first check the cache table 502 to determine if the requested LBA(s) are in the volatile cache, and if not, determine if the LBA(s) are stored in a MRC location. If not, the DSD may check the logical address mapping table 504 to determine the primary storage location at which to retrieve the data. The retrieved data may be loaded into the volatile cache, and the cache table 504 may be updated to reflect that the recently-read data is now stored in the volatile cache, but may not be located in the MRC. A method of utilizing the MRC is described in regards to FIG. 6.

Figure 6:
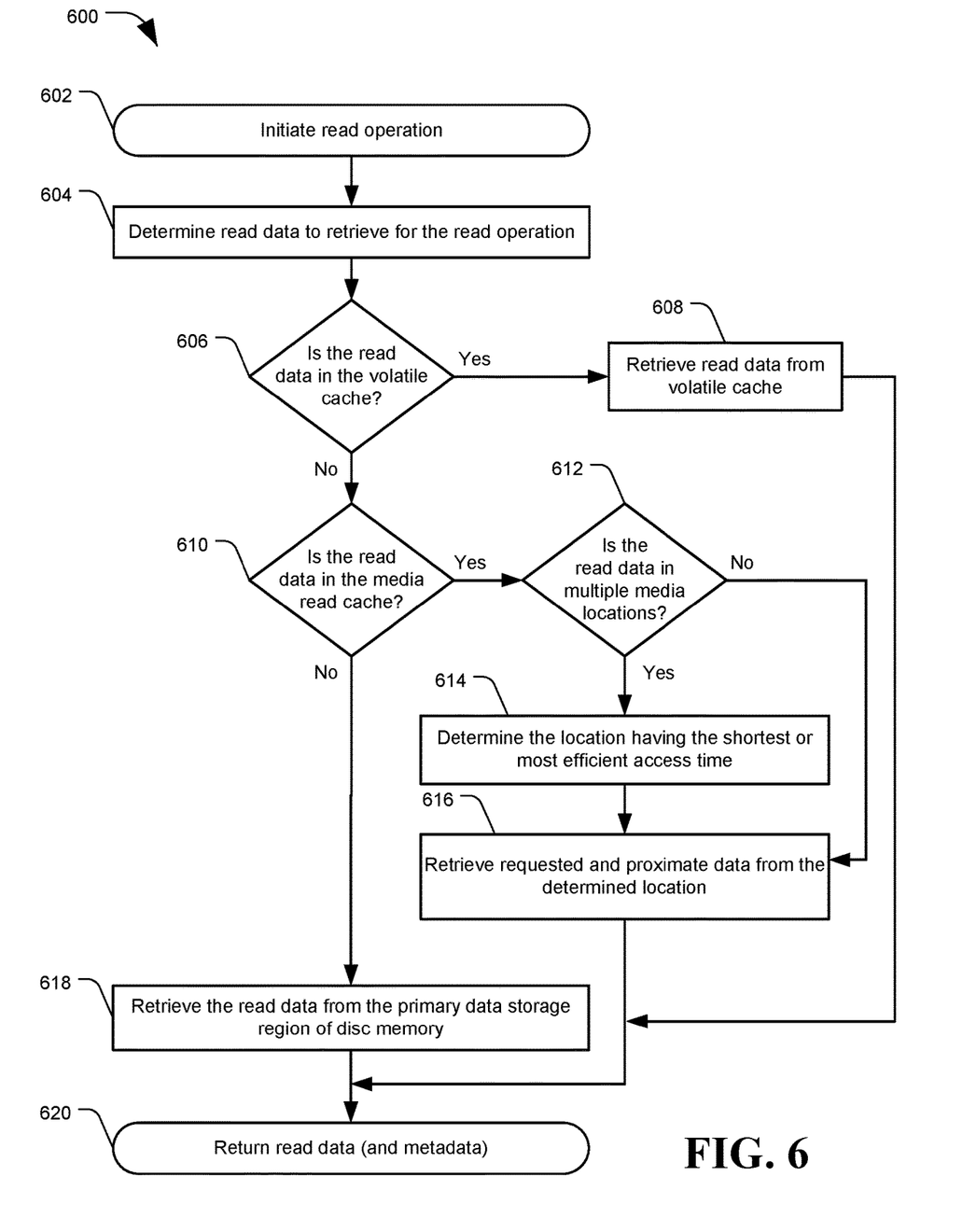
FIG. 6 depicts a flowchart of an example method for employing a media read cache, in accordance with certain embodiments of the present disclosure.

FIG. 6 depicts a flowchart of an example method 600 for employing a media read cache, in accordance with certain embodiments of the present disclosure. Method 600 may be performed by a data storage device, for example DSD 104 using controller 110 or media read cache module 112. Method 600 may include an example process for reading data from a media read cache (MRC).

The method 600 may include initiating a read operation, at 602. The read operation may be performed in response to receiving a read command from an attached host device, or may be initiated by the DSD itself, for example to retrieve system data. After initiating the read operation, the method 600 may include determining read data to retrieve for the read operation, at 604. Determining the read data may include identifying one or more logical block addresses (LBAs) to retrieve, such as by extracting a requested LBA range from a host read command.

Based on the determined read data, a determination may be made whether the read data is in the volatile cache, at 606. For example, the controller may compare the requested LBA range to LBAs listed in a mapping table for the volatile cache. If the data is in the volatile cache, the method 600 may include retrieving the read data from the volatile cache, at 608.

If at least some of the requested read data is not in the volatile cache, the method 600 may include determining whether the data is located in the MRC, at 610. The requested LBA range may be compared to a mapping table for the MRC, which may include checking the contents of multiple MRC regions. If the read data is in at least one region of the MRC, the method 600 may include determining whether the read data is in multiple media locations, at 612. This may include checking multiple MRC locations, as well as the permanently-mapped "primary" data storage location for the target data, if such primary location has a current version of the read data. Depending on a current or predicted read head position, it may sometimes be faster to retrieve the read data from the permanently-mapped position rather than from a MRC location.

If the read data is not stored to multiple media locations, at 612, the data may be retrieved from the single determined location, at 616. If the data is located in multiple media locations, the method 600 may include determining the location from the multiple locations having the shortest access time (e.g. based on determined seek and rotational latencies to reach the read data from a location the read head will end the prior operation), or most efficient access time, at 614. If the primary data storage region would be faster to access than a MRC location with the data, the efficiency determination 614 may include determining whether the MRC location has other valuable data to retrieve that would not be available from the primary storage region. If so, the method may determine that retrieving the read data from the MRC location is more efficient despite the primary storage region being faster for the read data. At 616, the method may include retrieving the data from the determined location. Retrieving the data from the MRC may include reading both the data specifically requested in the read operation, as well as other data stored proximate to the requested data in the MRC. Retrieving proximate data may include reading a selected number of sectors in the MRC before or after the sectors storing the requested data, retrieving all data stored to the same track as the requested data, retrieving all data stored to the same MRC as the requested data, or other implementations. In some embodiments, after determining that the requested data is stored to the MRC, the method may include determining what other data from the MRC is likely to be requested in temporal proximity, for example based on LBA ranges stored close to the requested LBA range, metadata associated with various cached data, hints received from the host, or based on other information.

Returning to 610, if the read data is not located in the volatile cache or the MRC, the method 600 may include retrieving the read data from the primary storage region of the disc memory (or other primary memory), at 618. Once the read data has been retrieved from the memory, at 608, 616, or 618, the method 600 may include returning the read data, at 620. For example, the data may be returned to a requesting host, or in response to the internal process that initiated in the read operation in the DSD. In some embodiments, additional metadata may be returned as part of the read response, or as a separate transmission. The metadata may include information about whether the requested read data was stored in a cache, which cache (e.g. which partition, or whether a cache hit was near the ID, MD, or OD), and may identify additional data that may have been retrieved along with the read data (e.g. if data was speculatively retrieved from the MRC in addition to the read data, such as data stored physically proximate to the read data, or data determined to be likely to accesses in temporal proximity to the requested read data). An example method of selecting data for the MRC is discussed in regard to FIG. 7.

Figure 7:
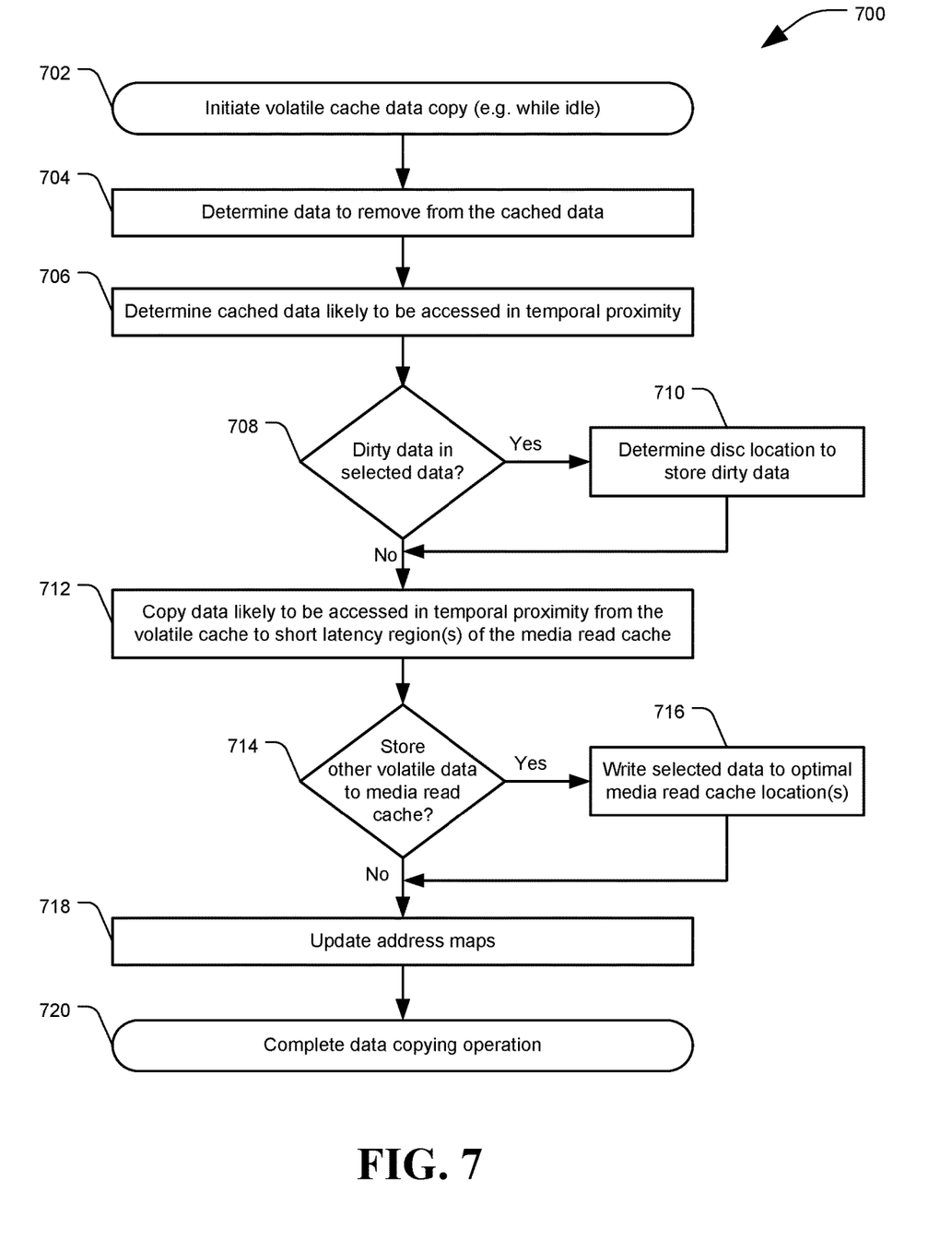
FIG. 7 depicts a flowchart of an example method for employing a media read cache, in accordance with certain embodiments of the present disclosure.

FIG. 7 depicts a flowchart of an example method 700 for employing a media read cache, in accordance with certain embodiments of the present disclosure. Method 700 may be performed by a data storage device, for example DSD 104 using controller 110 or media read cache module 112. Method 700 may include an example process for selecting data to store to a media read cache (MRC).

The method 700 may include initiating a volatile cache data copy operation, at 702. The copy operation may be implemented to clear space in the volatile cache memory by deleting or making data available to overwrite (e.g. an eviction or flush operation), to commit some data to non-volatile storage, or to copy data to a MRC so that the data can be removed from the volatile cache at a later point without implementing a disc write. In some embodiments, data may be copied from the volatile cache while the DSD is idle (e.g. there are no pending commands, or the number of pending commands are below a selected threshold). In other examples, a copy to MRC operation may be performed even during a heavy workload, for example if a determination is made that storing the data to the MRC would be a throughput advantage for the current workload over simply storing the data to a primary mapped storage location (e.g. for dirty data) or overwriting the data without moving it to a lower cache (e.g. for non-dirty data). The copy operation may be triggered by the amount of valid data in the volatile cache exceeding a threshold, and in some embodiments the threshold may be different for idle periods (e.g. a low threshold) versus high workload periods (e.g. a higher threshold).

At 704, the method 700 may include determining data to remove from the cached data. A determination of what data to remove from a volatile cache may be omitted if data is being copied, but not evicted, from the volatile cache. Data may be selected for removal based on various criteria. For example, data may be evicted if it is old data (e.g. has not been accessed for a selected period, or for longer than other cached data), cold data (has not been accessed frequently over a selected period), or otherwise determined to not be valuable enough to retain in the volatile cache. Some or all of the data selected for removal from the volatile cache may be copied to the MRC.

Accordingly, the selection criteria for which data to evict or copy may be dependent on which data are best suited for storage to the MRC. For example, data including long sets of sequential LBAs may take up a lot of volatile memory, but be well-suited to disc read operations. The DSD may determine data elements stored to the volatile cache that are likely to be accessed in close proximity with each other, at 706, and may copy those data elements to the MRC where they can be accessed together during a single read operation. The DSD may consider whether any data stored in the volatile cache is likely to be accessed in temporal proximity to data already stored in the MRC, and whether the data from the volatile cache can be stored in physical proximity to the data already in the MRC, allowing them both to be accessed during a single read operation. In some embodiments, both write and read data may be selected for eviction or copying, but the DSD will only evaluate read data for migration to an MRC based on whether it is likely to be accessed in temporal proximity, while the write data may be copied based on different procedures or considerations. In other words, the method 700 may not look for relationships between write data and read data during copying operations, depending on the implementation.

The DSD may employ multiple MRC algorithms for determining which data will be accessed in temporal proximity, or is otherwise suited for copying to the MRC. For example, data likely to be accessed in temporal proximity may be determined based on hints or indications from the host, such as which applications are starting up or running, which may indicate which files or data is likely to be accessed soon. In another example, machine learning, bloom filters, data access histories, and other information or algorithms may be used to determine which data is likely to be accessed in close proximity. The DSD may track data evicted from the volatile cache and later read requests, and note LBA ranges that would be MRC hits had a particular algorithm been used. Data likely to be accessed in temporal proximity may be given preference for selection as data for copying, for example by applying a modifier to a calculated selection value for each data item in the volatile cache. Such a selection process may maximize the overall efficiency of the DSD, with random unrelated data stored to the volatile cache, while data that can advantageously be read sequentially during a single read operation may be stored to disc media. Data that is not likely to be accessed in temporal proximity to other data in the volatile cache or MRC may still be selected for storage to the MRC.

At 708, a determination may be made whether there is dirty data included in the data selected for copying, especially if the data is scheduled to be evicted from the volatile cache. Dirty data may include valid data that has not been stored to a primary storage region of a nonvolatile memory (e.g. a storage region having persistent LBA to PBA mapping). If there is dirty data in the selected data that must be committed to reliable nonvolatile storage, the method 700 may include determining a disc location to store the dirty data, at 710. In some embodiments, such as when a drive is idle, the method may include copying the dirty data to the physical storage location in the primary storage region persistently corresponding to the LBA for the dirty data. The dirty data may alternately be copied to a media read cache, without first storing it a primary storage location. For example, a MRC region may be configured to store data in a format that is reliable enough that dirty data does not need to be stored to the primary storage region first (e.g. an MRC having tracks-per-inch, bits-per-inch, and error coding sufficient to provide high reading reliability as a sole storage location for the data), and the dirty data can be migrated to a MRC region along with non-dirty data, for example based on efficient grouping of data likely to be accessed in temporal proximity.

If there is no dirty data in the selected data, or once a suitable location on the disc for the data has been determined (and, optionally, the dirty data has been stored to the determined location), the method 700 may include copying the selected data from the volatile cache to short latency region(s) of the MRC, at 712. For example, the data may be stored to region(s) that allow temporally-related data to be accessed during a single read operation, such as stored sequentially along a single data track. In another example, portions of the data may be stored to locations of different discs that can be read simultaneously via parallelism. Storing data in an MRC near an outer diameter (OD) of a disc may also increase the amount of data that can be read over a period of time. A head resting position during idle periods may also be set near to the OD, potentially minimizing seek latencies as well. However, other positioning considerations may be used, such as storing copies of the same data to multiple MRC regions, or storing the data to a region near a middle diameter (MD) so that average seek latency may be minimized when a drive is not idle.

A determination may be made whether there is volatile cache data (e.g. data selected for eviction, at 704), other than those likely to be accessed in temporal proximity, still to be stored to the MRC, at 714. In one example, a file or data segment including a long range of contiguous LBAs may benefit from storage in the MRC, even if it is not determined to be temporally-related to other data. Data that is requested periodically, but not frequently enough to keep resident in the volatile cache, may also benefit from MRC storage. If there is additional data to store to the MRC, the method 700 may include writing the remaining selected data to optimal media read cache locations, at 716. For example, available regions near the OD may provide optimal read response times, as discussed above. In another example, a random data element may be copied to multiple MRC regions at various positions on the disc(s) surface(s), such as various cylinder and wedge locations (e.g. different radial and circumferential positions). This may allow the DSD to read the data from a MRC region with minimal seek and rotational latencies, from a set of multiple MRC regions containing the data.

After copying all data that was selected for storage to the MRC, the method 700 may include updating one or more address maps, at 718. The address map updates may reflect that the data is now available in one or more MRC regions, and if the data is scheduled for eviction, the updates may also indicate that the data is no longer available in the volatile cache. Dirty data flags or bits may also be updated, depending on whether any copied data was stored to the primary data storage region. At 720, the method 700 may include completing the volatile cache data copying operation. For example, this may include deleting or overwriting data in the volatile cache that was selected for eviction.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g. steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a data storage drive including:
     a volatile read cache;
     a disc memory including:
       a primary data storage region of the data storage drive configured for long-term storage of data via persistent logical block address (LBA) to physical block address (PBA) mapping;
       a media read cache region configured to store a copy of data from the volatile read cache;
     a controller configured to perform a read operation including:
       determine read data to retrieve for the read operation;
       retrieve the read data from the volatile read cache based on determining that the read data is available in the volatile read cache;
       retrieve the read data from the media read cache based on determining that the read data is not available in the volatile read cache and is available in the media read cache;
       retrieve the read data from the primary data storage based on determining that the read data is available in neither the volatile read cache nor the media read cache; and
     the controller further configured to record data to the media read cache at a higher storage density than data recorded to the primary data storage.

2. The apparatus of claim 1 comprising the controller further configured to record data to the media read cache at a higher bits per inch capacity than data recorded to the primary data storage.

3. The apparatus of claim 1 comprising the controller further configured to record data to the media read cache at a higher tracks per inch capacity than data recorded to the primary data storage.

4. The apparatus of claim 1 comprising the controller further configured to record data to the media read cache with reduced error correction encoding relative to data recorded to the primary data storage.

5. The apparatus of claim 1 comprising the controller further configured to load the read data retrieved from the media read cache into the volatile read cache.

6. The apparatus of claim 5 comprising the controller further configured to:
   initiate the read operation based on a read command received from a host device;
   determine additional data likely to be requested by the host device in temporal proximity to the read data; and
   retrieve the read data and the additional data from the media read cache during a single read operation.

7. The apparatus of claim 6 comprising the controller further configured to provide an indication to the host device that the additional data was retrieved in addition to the read data in response to the read command.

8. The apparatus of claim 1, further comprising:
   the controller configured to retrieve the read data from the media read cache via:
     determine whether the read data is stored in multiple media read cache locations;
     in response to determining that the read data is stored in multiple media read cache locations, determine a selected media read cache location having a shortest access time from the multiple media read cache locations;
     compare a first access time to the selected media read cache location to a second access time to a location of the read data in the primary data storage; and
     retrieve the read data from the selected media read cache location based on the first access time being less than the second access time.

9. The apparatus of claim 1, the controller further configured to:
   perform a data eviction operation to remove data from the volatile read cache, including:
     determine cached data elements in the volatile read cache likely to be accessed in temporal proximity to each other; and
     store the cached data elements likely to be accessed in temporal proximity to the media read cache in a manner permitting the cached data elements to be read in a single uninterrupted read operation.

10. The apparatus of claim 9, further comprising:
    the disc memory includes a plurality of recordable disc media arranged in a stack configured to rotate around a spindle, with multiple of the plurality of recordable disc media having a portion of the media read cache; and
    the data eviction operation further includes:
      store the cached data elements likely to be accessed in temporal proximity to portions of the media read cache on multiple discs from the plurality of recordable disc media, in a manner permitting simultaneous reading via parallelism.

11. The apparatus of claim 9 comprising the controller further configured to:
    determine whether data selected for eviction is dirty data; and
    store the cached data elements likely to be accessed in temporal proximity and commit the dirty data to non-volatile storage in a single write operation, including recording the dirty data to a location of the disc memory in a manner including sufficient quality control standards to reasonably ensure the data will be readable, prior to removing the dirty data from the volatile read cache.

12. A method comprising:
    receiving, from a host device, a read command requesting read data at a data storage drive including:
      a controller;
      a volatile read cache;
      a disc memory including:
        a primary data storage region of the data storage drive configured for long-term storage of data via persistent logical block address (LBA) to physical block address (PBA) mapping;
a media read cache region configured to store a copy of data from the volatile read cache;
performing a read operation in response to the read command, the read operation including:
retrieving the read data from the volatile read cache based on determining that the read data is available in the volatile read cache;
retrieving the read data from the media read cache based on determining that the read data is not available in the volatile read cache and is available in the media read cache, the read operation further including:
determining additional data likely to be requested by the host device in temporal proximity to the read data;
retrieving the read data and the additional data from the media read cache during a single read operation; and
retrieving the read data from the primary data storage based on determining that the read data is available in neither the volatile read cache nor the media read cache.

13. The method of claim 12, further comprising:
performing a data eviction operation to remove data from the volatile read cache, including:
determining cached data elements in the volatile read cache likely to be accessed in temporal proximity to each other; and
storing the cached data elements likely to be accessed in temporal proximity to the media read cache in a manner permitting the cached data elements to be read in a single uninterrupted read operation.

14. The method of claim 13 comprising performing the data eviction operation further includes:
performing the data eviction operation further includes storing portions of the cached data elements likely to be accessed in temporal to media read cache regions on multiple discs from a plurality of recordable disc media, in a manner permitting simultaneous reading via parallelism.

15. The method of claim 13 comprising performing the data eviction operation further includes:
determining whether data selected for eviction is dirty data;
recording the dirty data to the primary data storage prior to removing the dirty data from the volatile read cache;
recording the data selected for eviction to the media read cache in at least one of the following formats:
a higher bits per inch capacity than data recorded to the primary data storage;
a higher tracks per inch capacity than data recorded to the primary data storage; and
with reduced error correction encoding relative to data recorded to the primary data storage.

16. The method of claim 12 comprising performing the read operation further including:
loading the read data and the additional data retrieved from the media read cache into the volatile read cache; and
providing an indication to the host device that the additional data was retrieved in addition to the read data in response to the read command.

17. The method of claim 12 comprising performing the read operation further including:
determining whether the read data is stored in multiple media read cache locations;
in response to determining that the read data is stored in multiple media read cache locations, determining a selected media read cache location having a shortest access time from the multiple media read cache locations; and
retrieving the read data from the selected media read cache location.

18. A memory device storing instructions that, when executed, cause a circuit to perform a method comprising:
receiving, from a host device, a read command requesting read data at a data storage drive including:
a volatile read cache;
a disc memory including:
a primary data storage region of the data storage drive configured for long-term storage of data via persistent logical block address (LBA) to physical block address (PBA) mapping;
a media read cache region configured to store a copy of data from the volatile read cache;
performing a read operation in response to the read command, the read operation including:
retrieving the read data from the volatile read cache based on determining that the read data is available in the volatile read cache;
retrieving the read data from the media read cache based on determining that the read data is not available in the volatile read cache and is available in the media read cache;
retrieving the read data from the primary data storage based on determining that the read data is not available in the volatile read cache or the media read cache;
performing a data eviction operation to remove data from the volatile read cache, including:
determining cached data elements in the volatile read cache likely to be accessed in temporal proximity to each other; and
storing the cached data elements likely to be accessed in temporal proximity to the media read cache in a manner permitting the cached data elements to be read in a single uninterrupted read operation.

19. The memory device of claim 18 storing instructions that, when executed, cause the circuit to perform the method further comprising:
performing the read operation further includes:
retrieving, during a single read operation,
(1) the read data; and
(2) additional data likely to be requested by the host device in temporal proximity to the read data; and
loading the read data and the additional data retrieved from the media read cache into the volatile read cache.

20. The memory device of claim 18 storing instructions that, when executed, cause the circuit to perform the method further comprising:
performing the read operation further including:
determining whether the read data is stored in multiple media read cache locations;
in response to determining that the read data is stored in multiple media read cache locations, determining a selected media read cache location having a shortest access time from the multiple media read cache locations; and retrieving the read data from the selected media read cache location.

\* \* \* \* \*